Jan. 2, 1934.  W. H. LEWIS  1,941,562
MANUFACTURE OF STEEL
Filed Feb. 5, 1932
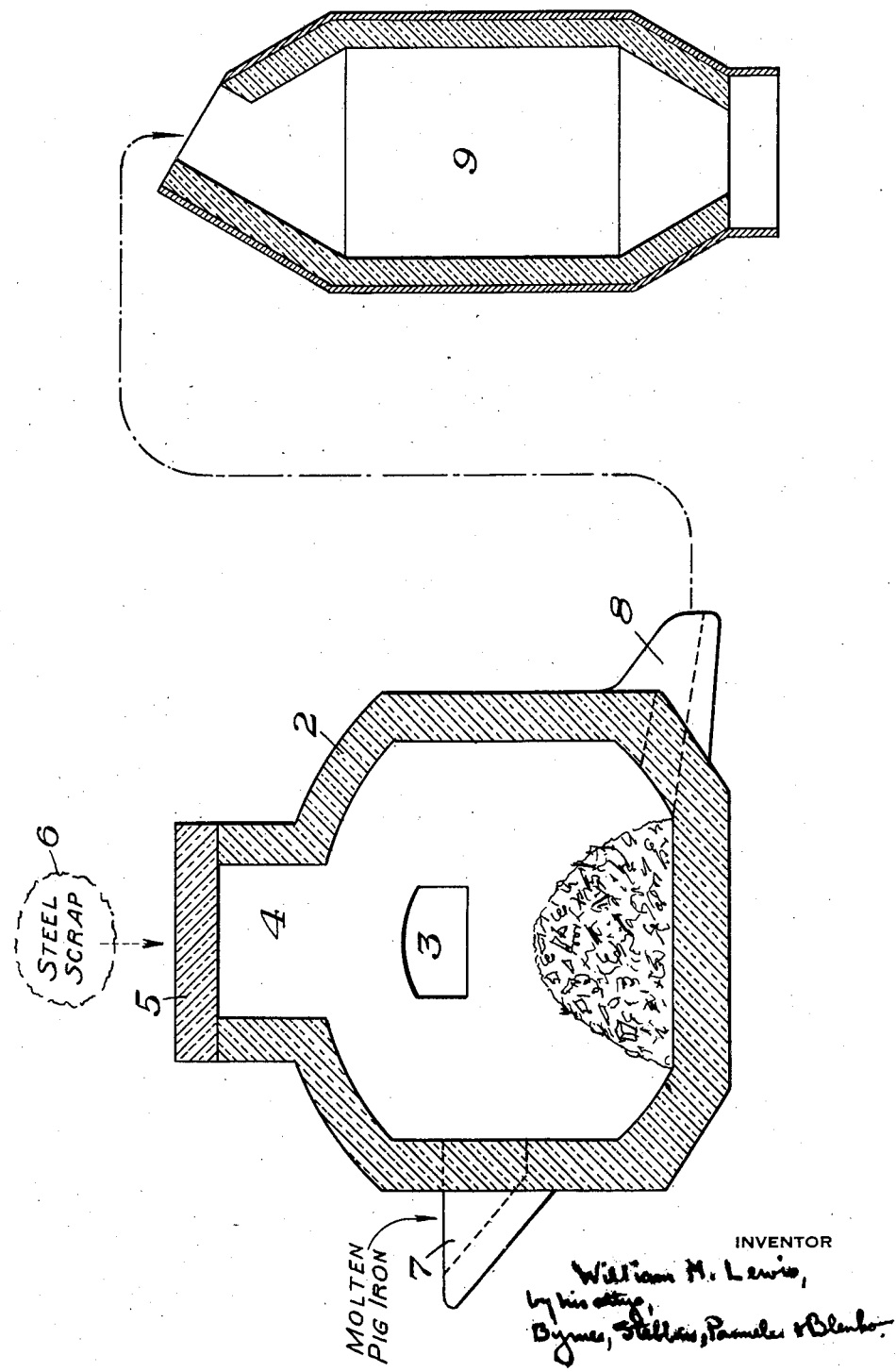

Patented Jan. 2, 1934

1,941,562

UNITED STATES PATENT OFFICE 1,941,562

MANUFACTURE OF STEEL

William H. Lewis, Pittsburgh, Pa.

Application February 5, 1932. Serial No. 591,032

2 Claims. (Cl. 75—44)

This invention relates to the manufacture of steel and is particularly directed to a process involving the use of the Bessemer converter.

The Bessemer process has long been known as a rapid and efficient means of converting iron into steel, and Bessemer steel, by reason of certain properties, fills a definite industrial need. Unfortunately, however, it has been necessary to supply to the Bessemer converter a charge which is practically all iron. Heats, such as ordinarily employed in open hearth furnaces, as, for example, 50 percent pig and 50 percent scrap, have been out of the question for the reason that the temperature of the charge in the Bessemer process is obtained by combustion of the carbon and silicon in the pig iron, and it has been considered that the presence of any material amount of steel in the charge would so chill it as to render the process unworkable.

The Bessemer process has heretofore been largely confined, so far as United States practice is concerned, to the use of iron made from special low phosphorous ores. The amount of Bessemer ores available is steadily decreasing, and a process which will conserve such ores and permit of the use of steel scrap as a part of the charge would be highly desirable.

I provide such a process and overcome the difficulties heretofore encountered by initially preheating the charge so that its sensible heat is sufficient, with the heat of combustion in the Bessemer converter, to maintain the charge at the necessary high temperature. I prefer to use a regenerative furnace for melting the scrap. If molten pig iron is available it will be poured into the furnace with the scrap so that a suitable admixture of the raw materials will be effected; or, if desired, cold pig may be added to the furnace and melted with the scrap. Preferably the molten charge will be superheated, say to a temperature of 2900° F., before it is taken from the furnace. The molten mixture of iron and steel will then be transferred to the Bessemer converter and blown in the usual manner. While, of course, the percentage of carbon in the total charge is considerably lower than in the case of an all-pig charge to the converter, nevertheless the sensible heat of the charge with the heat of combustion of the carbon and silicon will serve to keep the charge at the desired high temperature.

If a steel is required containing a lower phosphorous content than can be produced in an acid lined converter, it is possible by my process to use a basic lined converter and make the necessary additions to lower the phosphorous content.

The accompanying figure of drawing is a diagrammatic view illustrating the steps of my process. The drawing shows a regenerative furnace indicated generally by the reference character 2. A port for flame is indicated at 3 but the regenerative system is omitted for the sake of clearness. It should be noted, however, that by reason of the fact that the furnace will ordinarily be purely for melting purposes, the design of the furnace may be considerably simplified, as compared with open hearth practice, and the combustion conditions improved.

In the drawing the furnace is shown with an opening 4 through the roof having a removable cover 5. Steel scrap, indicated by the reference character 6, may be supplied through the top by an overhead crane. Preferably the steel scrap will be supplied first and by reason of the fact that it is piled on the hearth of the furnace it will be quickly melted down. The molten pig iron is added through a spout 7 and becomes intimately mixed with the melted scrap. The entire charge is brought up to a very high temperature before tapping. The furnace 2 may be of the tilting type, but for simplicity of illustration I have omitted all details of this sort and have shown the ordinary tapping hole 8. The molten metal is transferred to a Bessemer converter, illustrated diagrammatically at 9, and is there Bessemerized.

Numerous advantages flow from the use of my invention. The cost of raw material is very greatly reduced because of the low cost of steel scrap. The loss in weight of the charge during blowing is considerably less because of the lower carbon and silicon content in the total charge. To state it in another way, this shrinkage, which may be considered as the "fuel cost" of the Bessemer process, is so much less that the total cost for fuel in preliminarily heating the charge in the furnace and then blowing in the converter is less than in the usual Bessemer operation. There will be less oxidation of metal in the converter because of the shortening of time required to decarbonize and desiliconize the charge, and there will be a decided reduction in the amount of slag produced. The refractory cost will also be lower as the converter lining and the bottom will have a considerably longer life. Since no refining is done in the melting furnace it will not be necessary to use fluxing materials or design the furnace to accommodate a large volume of slag. As a matter of fact, there will be so little slag and dross produced that the steel in the furnace will not be heavily blanketed with slag as is the case in the usual open hearth melting practice, and, consequently, the heating conditions will be improved.

The character of the final product may be readily controlled. If acid steel is required there can readily be produced in the melting furnace a molten metal having the specified phosphorous content, and this metal can be blown in an acid lined converter. If it is desired that the metal be of low phosphorous content the refining can be carried out in a basic lined converter.

I have illustrated and described a present preferred embodiment of the invention. It will be understood, however, that it is not limited to the form shown but may be otherwise embodied or practiced within the scope of the following claims

I claim:

1. In the method of making steel, the steps consisting in melting steel scrap in a regenerative furnace, adding pig iron to the furnace, superheating the entire charge to a temperature of the order of 2900° F., transferring the charge to a Bessemer converter, and there Bessemerizing it.

2. The method of making steel and utilizing high phosphorus or non-Bessemer pig iron which comprises melting in a regenerative furnace such iron with a material amount of steel scrap, superheating the molten mixture to a temperature of the order of 2900° F., transferring the charge to a Bessemer basic converter, and there Bessemerizing it.

WILLIAM H. LEWIS.